United States Patent
Han et al.

(10) Patent No.: US 10,263,255 B2
(45) Date of Patent: **\*Apr. 16, 2019**

(54) LITHIUM SECONDARY BATTERY

(71) Applicant: SK INNOVATION CO., LTD., Seoul (KR)

(72) Inventors: Kook-Hyun Han, Daejeon (KR); Kyung-Bin Yoo, Daejeon (KR); Duck-Chul Hwang, Gyeonggi-do (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,180

(22) Filed: Sep. 9, 2016

(65) Prior Publication Data

US 2017/0077513 A1    Mar. 16, 2017

(30) Foreign Application Priority Data

Sep. 10, 2015 (KR) .................. 10-2015-0128149

(51) Int. Cl.
| | |
|---|---|
| *H01M 4/505* | (2010.01) |
| *H01M 10/0525* | (2010.01) |
| *H01M 2/16* | (2006.01) |
| *H01M 4/131* | (2010.01) |
| *H01M 4/525* | (2010.01) |
| *H01M 4/02* | (2006.01) |

(52) U.S. Cl.
CPC ......... *H01M 4/505* (2013.01); *H01M 2/1646* (2013.01); *H01M 2/1686* (2013.01); *H01M 4/131* (2013.01); *H01M 4/525* (2013.01); *H01M 10/0525* (2013.01); *H01M 2004/021* (2013.01); *H01M 2004/028* (2013.01); *H01M 2220/30* (2013.01)

(58) Field of Classification Search
CPC ...... H01M 4/131; H01M 4/485; H01M 4/505; H01M 4/525; H01M 4/1391; H01M 10/052; H01M 10/0525
See application file for complete search history.

(56) References Cited

U.S. PATENT DOCUMENTS

| | | | | |
|---|---|---|---|---|
| 2007/0254209 A1* | 11/2007 | Baba | ...................... | H01M 2/14 429/129 |
| 2009/0068561 A1* | 3/2009 | Sun | ...................... | H01M 4/131 429/223 |
| 2014/0027670 A1* | 1/2014 | Sun | ...................... | H01M 4/483 252/182.1 |

FOREIGN PATENT DOCUMENTS

| | | | |
|---|---|---|---|
| KR | 10-2006-0134631 A | 12/2006 | |
| WO | WO-2012093797 A2 * | 7/2012 | ............ H01M 4/364 |

\* cited by examiner

*Primary Examiner* — Jimmy Vo
(74) *Attorney, Agent, or Firm* — The PL Law Group, PLLC

(57) ABSTRACT

A lithium secondary battery includes a cathode electrode, an anode electrode, and a separation film installed between the cathode electrode and the anode electrode, wherein the cathode electrode includes a cathode active material containing lithium-metal oxide of which at least one of metals has a concentration gradient region between a core part and a surface part thereof, and the separation film includes a base film and a ceramic coating layer formed on at least one surface of the base film, such that it is possible to achieve a significantly improved effect in both of the lifespan property and penetration durability.

17 Claims, 3 Drawing Sheets

LITHIUM SECONDARY BATTERY

CROSS REFERENCE TO RELATED APPLICATIONS AND CLAIM OF PRIORITY

The application claims the benefit of Korean Patent Application No. 10-2015-0128149, filed on Sep. 10, 2015, at the Korean Intellectual Property Office, the disclosures of which are incorporated herein in their entirety by reference.

BACKGROUND

1. Field of the Invention

The present invention relates to a lithium secondary battery, and more specifically, to a lithium secondary battery which has excellent life span property and penetration safety.

2. Description of the Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased day by day. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes an anode electrode made of a carbon material capable of absorbing and desorbing lithium ions, a cathode electrode made of lithium-containing oxide, and a non-aqueous electrolyte containing lithium salt dissolved in a mixed organic solvent in a suitable amount.

In this regard, as the application of the lithium secondary battery is more enlarged, a case that the lithium secondary battery should be used even under more severe environments is increased.

However, lithium transition metal oxide or composite oxide used as a cathode active material of the lithium secondary battery entails a problem that a metal component is desorbed from the cathode electrode during storage at a high temperature under fully charged condition, hence being in thermally unstable state. In addition, when a forced internal short circuit occurs due to an external impact, a heating value inside the battery is rapidly increased, thereby causing ignition.

In order to solve the above problems, Korean Patent Laid-Open Publication No. 2006-0134631 discloses a cathode active material having a core-shell structure in which a core part and a shell part are made of lithium transition metal oxides different from each other, however, still has lack of improvement in life-span property and safety of the battery.

SUMMARY

Accordingly, it is an object of the present invention to provide a lithium secondary battery which has excellent life-span property and penetration safety.

In order to achieve the above object, according to one aspect of the present invention, there is provided a lithium secondary battery, including a cathode electrode, an anode electrode, and a separation film installed between the cathode electrode and the anode electrode, wherein the cathode electrode includes a cathode active material containing lithium-metal oxide of which at least one of metals has a concentration gradient region between a core part and a surface part thereof, and the separation film includes a base film and a ceramic coating layer formed on at least one surface of the base film.

In the lithium secondary battery according to one embodiment of the present invention, another of the metals included in the lithium-metal oxide may have a constant concentration between the core part and the surface part.

In the lithium secondary battery according to one embodiment of the present invention, the lithium-metal oxide may include a first metal having a concentration gradient region with increased concentration between the core part and the surface part, and a second metal having a concentration gradient region with decreased concentration between the core part and the surface part.

In the lithium secondary battery according to one embodiment of the present invention, the lithium-metal oxide may be represented by Formula 1 below, and at least one of M1, M2 and M3 may have a concentration gradient region between the core part and the surface part:

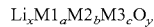  [Formula 1]

$$Li_xM1_aM2_bM3_cO_y$$

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq 2.02$, $0\leq a\leq 1$, $0\leq b\leq 1$, $0\leq c\leq 1$, and $0<a+b+c\leq 1$).

In the lithium secondary battery according to one embodiment of the present invention, at least one of the M1, M2 and M3 may have a concentration gradient region with increased concentration between the core part and the surface part, while the others may have a concentration gradient region with decreased concentration between the core part and the surface part.

In the lithium secondary battery according to one embodiment of the present invention, at least one of the M1, M2 and M3 may have a concentration gradient region with increased concentration between the core part and the surface part, another may have a concentration gradient region with decreased concentration between the core part and the surface part, and the other may have a constant concentration between the core part and the surface part.

In the lithium secondary battery according to one embodiment of the present invention, the M1, M2 and M3 may be Ni, Co and Mn, respectively.

In the lithium secondary battery according to one embodiment of the present invention, the M1 may be Ni, and $0.6\leq a\leq 0.95$ and $0.05\leq b+c\leq 0.4$.

In the lithium secondary battery according to one embodiment of the present invention, the M1 may be Ni, and $0.7\leq a\leq 0.9$ and $0.1\leq b+c\leq 0.3$.

In the lithium secondary battery according to one embodiment of the present invention, the ceramic coating layer may include ceramic powders having an average particle diameter of 0.01 to 2.0 μm.

In the lithium secondary battery according to one embodiment of the present invention, the ceramic coating layer may include the ceramic powders in an amount of 80 to 97% by weight to a total weight of the coating layer.

In the lithium secondary battery according to one embodiment of the present invention, the ceramic coating layer may include metal oxide containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cesium (Ce), as the ceramic powders.

In the lithium secondary battery according to one embodiment of the present invention, the ceramic coating layer may include at least one selected from a group consisting of $Al_2O_3$, $TiO_2$, $ZrO_2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN-PT, $HfO_2$, $SrTiO_3$, $SnO_3$ and $CeO_2$, as the ceramic powders.

In the lithium secondary battery according to one embodiment of the present invention, the ceramic coating layer formed on the one surface of the separation film may have a thickness of 1 to 10 μm.

In the lithium secondary battery according to one embodiment of the present invention, the ceramic coating layer may have a sum of total thickness of 2 to 20 μm.

The lithium secondary battery according to the present invention includes a combination of the cathode active material containing the metal having the concentration gradient, and the separation film including the ceramic coating layer formed thereon, such that it is possible to achieve a significantly improved effect in both of the lifespan property and penetration durability.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
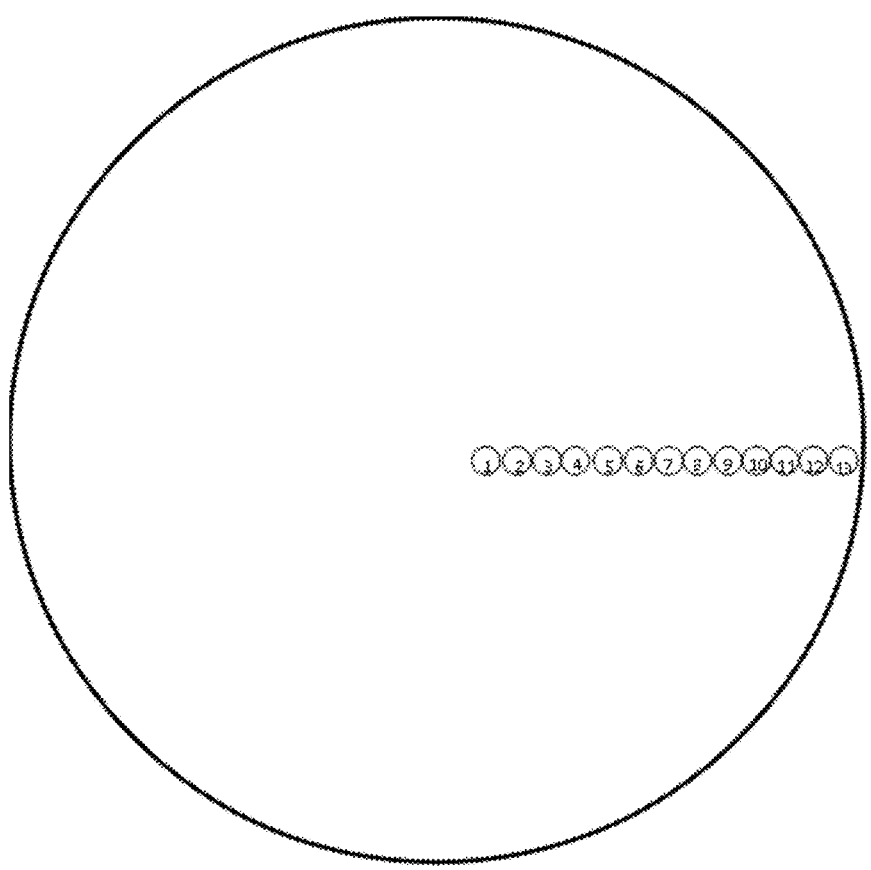
FIG. 1 is a view schematically illustrating a site of measuring a concentration of metal elements included in lithium-metal oxide according to an embodiment of the present invention.
Figure 2:
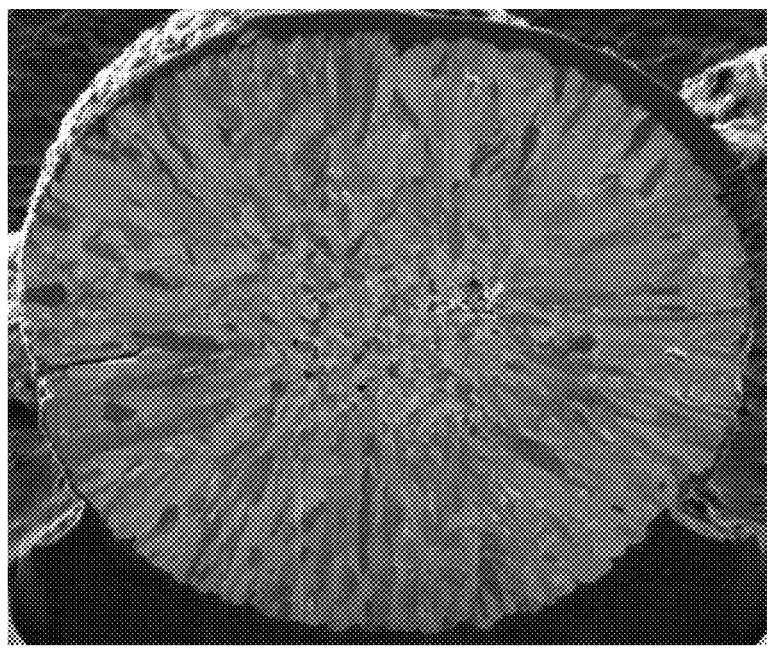
FIG. 2 is a photograph illustrating a cross section of lithium-metal oxide of Example 1.
Figure 3:
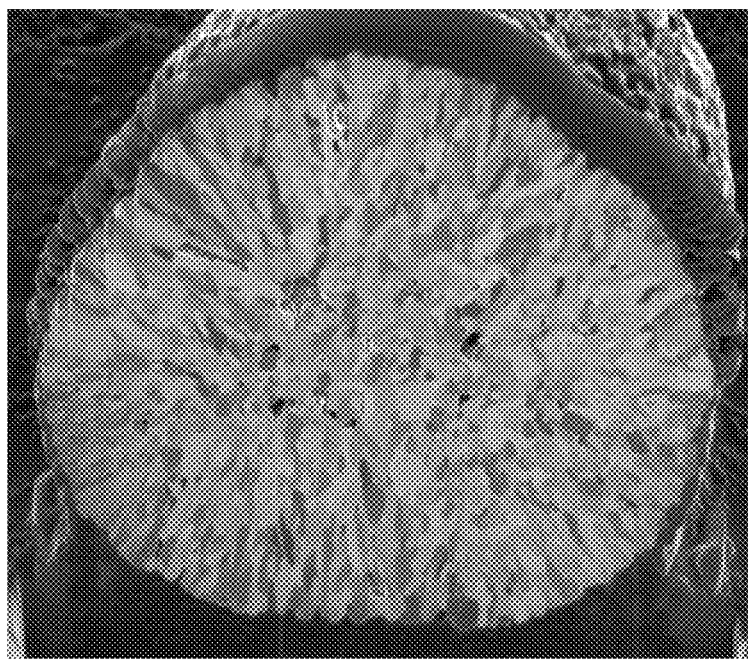
FIG. 3 is a photograph illustrating a cross section of lithium-metal oxide of Example 13.
Figure 4:
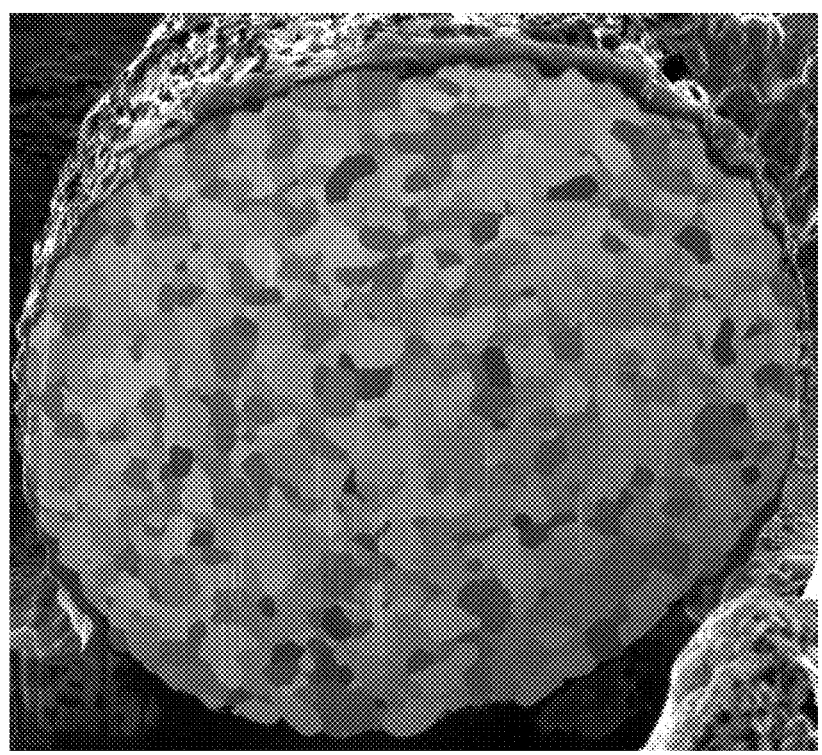
FIG. 4 is a photograph illustrating a cross section of lithium-metal oxide of Comparative Example 1.

The present invention discloses a lithium secondary battery, including a cathode electrode, an anode electrode, and a separation film installed between the cathode electrode and the anode electrode, wherein the cathode electrode includes a cathode active material containing lithium-metal oxide of which at least one of metals has a concentration gradient region between a core part and a surface part thereof, and the separation film includes a base film and a ceramic coating layer formed on at least one surface of the base film, such that it is possible to achieve a significantly improved effect in both of the lifespan property and penetration durability.

Hereinafter, the present invention will be described in more detail.

The present invention relates to a lithium secondary battery including a cathode electrode coated with a cathode active material, an anode electrode coated with an anode active material, and a separation film which is installed between the cathode electrode and the anode electrode and has a ceramic coating layer formed thereon.

Cathode Electrode

The cathode electrode according to the present invention includes the cathode active material containing lithium-metal oxide which has a specific concentration gradient.

The cathode active material used in the present invention includes lithium-metal oxide of which at least one of metals has a concentration gradient region between a core part and a surface part thereof. Such a cathode active material exhibits superior life-span property, compared to a cathode active material without a change in the concentration.

In the present invention, the fact that the metal of the lithium-metal oxide has a concentration gradient region between the core part and the surface part, means that other metals except for lithium may have a concentration distribution region varying in a constant tendency between a core part and a surface part of a lithium-metal oxide particle. The concentration distribution region (i.e., the concentration gradient region) may be located at any position without particular limitation thereof so long as it is between the core part and the surface part. The constant tendency means that a development of the entire concentration change is decreased or increased, however, does not exclude that a value opposed to the above tendency may be represent at a position.

In the present invention, the core part of the particle means an area within 0.1 μm radius from a center of the active material particle, while the surface part means an area within 0.1 μm from the outmost portion of the particle.

The cathode active material according to the present invention may include at least one of metals having a concentration gradient. Therefore, as one embodiment, the cathode active material may include a first metal having a concentration gradient region with increased concentration between the core part and the surface part, and a second metal having a concentration gradient region with decreased concentration between the core part and the surface part. The first metal or second metal may be each independently at least one of metals.

As another embodiment of the present invention, the cathode active material according to the present invention may include metal having a constant concentration between the core part and the surface part.

A specific example of the cathode active material according to the present invention may include lithium-metal oxide represented by Formula 1 below, wherein at least one of M1, M2 and M3 has a concentration gradient region between the core part and the surface part:

   [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and 0<x≤1.1, 2≤y≤2.02, 0≤a≤1, 0≤b≤1, 0≤c≤1, and 0<a+b+c≤1).

According to one embodiment of the present invention, at least one of M1, M2 and M3 may have a concentration gradient region with increased concentration between the core part and the surface part, while the others may have a concentration gradient region with decreased concentration between the core part and the surface part.

According to another embodiment of the present invention, at least one of M1, M2 and M3 may have a concentration gradient region with increased concentration between the core part and the surface part, another may have a concentration gradient region with decreased concentration between the core part and the surface part, and the other may have a constant concentration between the core part and the surface part.

As a specific example of the present invention, M1, M2 and M3 may be Ni, Co and Mn, respectively.

The lithium-metal oxide according to the present invention may have a relatively higher content of nickel (Ni). Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may exhibit excellent life-span property while maintaining a high capacity.

For example, with regard to the lithium-metal oxide according to the present invention, a molar ratio of Ni may range from 0.6 to 0.95, and preferably, 0.7 to 0.9. That is, if M1 is Ni in the above Formula 1, it may be $0.6 \leq a \leq 0.95$ and $0.05 \leq b+c \leq 0.4$, and preferably, $0.7 \leq a \leq 0.9$ and $0.1 \leq b+c \leq 0.3$.

A particle shape of the lithium-metal oxide according to the present invention is not particularly limited, but a primary particle thereof preferably has a rod-type shape.

A particle size of the lithium-metal oxide according to the present invention is not particularly limited, and may be a range of 3 to 25 μm, for example.

The cathode active material according to the present invention may further include a coating layer on the above-described lithium-metal oxide. The coating layer may be made of metal or metal oxide including, for example, Al, Ti, Ba, Zr, Si, B, Mg and P, and alloys thereof or oxides of the above metal.

As necessary, the cathode active material according to the present invention may have a configuration in which the above-described lithium-metal oxide is doped with metals. Such a doping metal may include Al, Ti, Ba, Zr, Si, B, Mg, P, V, W, or the like, which may be used alone or in combination of two or more thereof.

The lithium-metal oxide according to the present invention may be prepared by co-precipitation.

Hereinafter, a method for preparing a cathode active material according to one embodiment of the present invention will be described.

First, a metal salt aqueous solution for forming a core part is prepared, and then, a metal salt aqueous solution for forming a surface part is prepared. Next, the metal salt aqueous solution for forming a core part is mixed with the metal salt aqueous solution for forming a surface part according to a required concentration gradient, and a chelating agent and an alkaline aqueous solution are mixed in a reactor, so as to prepare a precipitate having a concentration gradient of at least one metal element between the core part and the surface part.

After the prepared precipitate is subjected to heat treatment, if it is mixed with a lithium salt and the mixture is again subjected to heat treatment, a cathode active material according to the present invention may be obtained.

The cathode electrode according to the present invention may be formed by adding a solvent and, optionally, a binder, conductive material, dispersant, etc. to the cathode active material, and agitating the same to prepare a cathode slurry, then applying (coating) the slurry to a collector made of a metal material, and drying and pressing the same.

The binder may include any one commonly used in the related art without particular limitation thereof. For example, an organic binder such as vinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is metal having high conductivity and being easily attached with the slurry of the cathode electrode or anode active material. The metal used herein may include any one if it does not have reactivity in the voltage range of the battery. As non-limited examples, the cathode electrode collector may include aluminum, nickel, or a foil made of a combination thereof. As the non-limited examples, the anode electrode collector may include copper, gold, nickel or a copper alloy, or a foil made of a combination thereof.

Anode Electrode

The anode electrode according to the present invention may include any one generally used in the related art without particular limitation thereof.

The anode active material useable in the present invention may include any material known in the related art, so long as it can absorb and desorb lithium ions, without particular limitation thereof. For example, carbon materials such as crystalline carbon, amorphous carbon, carbon composite, carbon fiber, etc., lithium metal, alloys of lithium and other elements, silicon, or tin may be used. The amorphous carbon may include, for example, hard carbon, cokes, mesocarbon microbead (MCMB) calcined at a temperature of 1500° C. or less, mesophase pitch-based carbon fiber (MPCF), or the like. The crystalline carbon may include graphite materials, and specifically, natural graphite, graphite cokes, graphite MCMB, graphite MPCF, or the like. Other elements used together with lithium to form an alloy thereof may include, for example, aluminum, zinc, bismuth, cadmium, antimony, silicone, lead, tin, gallium or indium.

A size of the graphite used in the present invention is not particularly limited, but the graphite may have an average particle diameter of 5 to 30 μm.

The anode electrode according to the present invention may be formed by adding a solvent and, optionally, a binder, conductive material, dispersant, etc. to the above-described anode active material, and agitating the same to prepare an anode slurry, then applying (coating) the slurry to a collector made of a metal material, and drying and pressing the same. In this case, the solvent, binder, conductive material, dispersant, etc. may use the same material as the above-described cathode electrode, and may apply the same forming method as thereof.

Separation Film

The separation film according to the present invention is installed between the cathode electrode and the anode electrode to play a role of insulating the same from each other, and may include a ceramic coating layer on at least one surface thereof.

The secondary battery according to the present invention uses the separation film coated with the ceramic together with the cathode electrode coated with the above-described cathode active material, such that it is possible to exhibit superior life-span property, compared to an cathode electrode having the same constitutional composition without a concentration gradient, and significantly improve safety for a penetration evaluation, even if a separation film having a ceramic coating layer with a relatively thinner thickness is used.

In regard of the penetration evaluation, if an external impact is applied to the secondary battery to be penetrated, a heating value at the penetrated portion thereof is rapidly increased. Thereby, the separation film inside the battery may be contracted, and two electrodes of cathode and anode are exposed to an outside to cause a short circuit between the electrodes, and thereby become more likely to be additionally ignited and exploded. On the other hand, the secondary battery according to the present invention uses the above-described cathode electrode coated with the cathode active material together with the separation film coated with the ceramic, such that it is possible to decrease the heating value of the battery, so as to significantly improve the safety (safety in penetration evaluation).

The separation film according to the present invention may include a base film and a ceramic coating layer formed by applying a ceramic coating composition containing ceramic powders to at least one surface of the base film.

The base film useable in the present invention may include a conventional porous polymer film, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, conventional porous woven fabrics, for example, a woven fabric made of high-melting point glass fiber, polyethylene terephthalate fiber, etc., may be used, but it is not particularly limited thereto.

As a method of applying the base film to the battery, lamination (stacking), folding, etc. of the separation film and the electrodes may be used, other than winding of a typical method.

The ceramic powders useable in the present invention may have an average particle diameter of 0.01 to 2.0 μm, preferably, 0.3 to 1.5 μm. Within the above range, dispersion characteristics may be suitably maintained.

The ceramic powders may be metal oxide containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cesium (Ce). The metal oxide may include at least one selected from a group consisting of $Al_2O_3$, $TiO_2$, $ZrO_2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN-PT, $HfO_2$, $SrTiO_3$, $SnO_3$ and $CeO_2$, but it is not limited thereto. These compounds may be used alone or in combination of two or more thereof.

The ceramic powders may be included in an amount of 80 to 97% by weight ('wt. %') to a total weight of the coating layer, and preferably, 90 to 95 wt. %. Within the above range, dispersion characteristics may be suitably maintained.

The ceramic coating composition according to the present invention may include a binder resin, a solvent, other additives, etc. other than the ceramic powders.

The binder resin useable in the present invention may include polyvinylidenefluoride-co-hexafluoropropylene, polyvinylidene fluorideco-trichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, polyvinylalcohol, or the like, but it is not limited thereto.

The solvent useable in the present invention may include at least one selected from tetrachloroethane, methylene chloride, chloroform, 1,1,2-trichloroethane, tetrahydrofuran, 1,4-dioxane, chlorobenzene, cyclohexanone, dimethylformamide, acetone, dimethylacetamide, dimethylsulfoxide, N-methyl-2-pyrrolidone, which may be used alone or in combination of two or more thereof.

A method of forming the ceramic coating layer according to the present invention is not particularly limited, but may use, for example, bar, rod, die, wire, comma, micro gravure/gravure, dip, spray or spin coating, or a mixed method and a modified method thereof, etc.

A thickness of the ceramic coating layer coated on any one surface of the base film according to the present invention is not particularly limited, but may be, for example, 1 to 10 μm, and preferably, 2 to 7 μm. Within the above range, it is possible to prevent a separator from being contracted during penetrating the ceramic coating layer, thereby the penetration safety of the battery may be more improved, and a rapid decrease in life span may be effectively suppressed.

In addition, when forming the ceramic coating layer according to the present invention on both surfaces of the base film, the ceramic coating layer may have a sum of total thickness of 2 to 20 μm. Within the above range, it is possible to more improve the penetration safety of the battery, and preferably, the ceramic coating layers are formed on both surfaces of the base film.

The lithium secondary battery according to the present invention may further include a non-aqueous electrolyte, and the non-aqueous electrolyte may include lithium salt which is an electrolyte and an organic solvent. The lithium salt may include any one typically used for a lithium secondary battery electrolyte without particular limitation thereof. Representative examples of the organic solvent may include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof.

The non-aqueous electrolyte may be introduced into an electrode structure including a cathode electrode, an anode electrode, and a separation film installed between the cathode electrode and the anode electrode, so as to prepare a lithium secondary battery.

An appearance of the lithium secondary battery of the present invention is not particularly limited, but may include, for example, a cylindrical or square form using a can, a pouch type or a coin type.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Cathode Electrode

Lithium-metal oxide (hereinafter, CAM-1) with a whole composition of $LiNi_{0.8}Co_{0.1}Mn_{0.1}O_2$, a core part composition of $LiNi_{0.83}Co_{0.10}Mn_{0.017}O_2$ and a surface part composition of $LiNi_{0.78}Co_{0.10}Mn_{0.12}O_2$, having a concentration gradient of nickel and manganese at a region between the core part and the surface part as a cathode active material, Denka Black as a conductive material, and PVDF as a binder were used in a weight ratio of 92:5:3, respectively, to prepare a cathode electrode slurry. Thereafter, the slurry was applied to an aluminum substrate to coat the same, followed by drying and pressing to prepare a cathode electrode.

For reference, the concentration gradient of the prepared lithium-metal oxide is listed in Table 1 below, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 1

| Site | Ni | Co | Mn |
|---|---|---|---|
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

<Anode Electrode>

An anode electrode slurry including 93 wt. % of natural graphite (d002 3.358 Å) as an anode active material, 5 wt. % of a flake type conductive material, that is, KS6 as a conductive material, 1 wt. % of SBR as a binder, and 1 wt. % of CMC as a thickener was applied to a copper substrate, followed by drying and pressing to prepare an anode electrode.

<Separation Film>

Ceramic coating layers (A-1) including boehmite (AlO(OH)) and an acrylate binder in a weight ratio of 90:10 were respectively formed on upper and lower surfaces of polyethylene fabric having a thickness of 16 μm, so as to reach a thickness of 1 μm, respectively.

<Battery>

By notching both of a cathode electrode and an anode electrode in a suitable size, respectively, laminating the same, and installing the prepared separation film including ceramic layers between the cathode electrode and the anode electrode, a cell was prepared. Tap parts of the cathode electrode and the anode electrode were welded, respectively. A combination of the welded cathode electrode/separation film/anode electrode was put into a pouch, followed by sealing three sides of the pouch except one side into which an electrolyte is injected. In this case, a portion having the tap is included in the sealing portion. After injecting the electrolyte through the remaining one side, the one side was also sealed, followed by impregnation for 12 hours or more. The electrolyte used herein was formed by preparing 1M $LiPF_6$ solution with a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted with a current (2.5 A) corresponding to 0.25 C for 36 minutes. After 1 hour, degassing and then aging were conducted for 24 hours or more, followed by chemical charging-discharging (charge condition: CC-CV 0.2 C 4.2 V 0.05 C CUT-OFF; discharge condition: CC 0.2 C 2.5 V CUT-OFF). Thereafter, standard charging-discharging was conducted (charge condition: CC-CV 0.5 C 4.2 V 0.05 C CUT-OFF; discharge condition: CC 0.5 C 2.5 V CUT-OFF).

Example 13

Lithium-metal oxide (hereinafter, CAM-2) with a whole composition of $LiNi_{0.80}Co_{0.11}Mn_{0.09}O_2$, a core part composition of $LiNi_{0.802}Co_{0.11}Mn_{0.088}O_2$ and a surface part composition of $LiNi_{0.77}Co_{0.11}Mn_{0.12}O_2$ having a concentration gradient of nickel and manganese at a surface portion between the core part and the surface part as a cathode active material, Denka Black as a conductive material, and PVDF as a binder were used in a weight ratio of 92:5:3, respectively, to prepare a cathode electrode slurry. Thereafter, the slurry was applied to an aluminum substrate to coat the same, followed by drying and pressing to prepare a cathode electrode.

For reference, the concentration gradient of the prepared lithium-metal oxide is listed in Table 2 below, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 2

| Site | Ni | Co | Mn |
|---|---|---|---|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 13 | 0.770 | 0.110 | 0.120 |

Comparative Example 1

The same procedures as described in Example 1 were conducted to prepare batteries except that $LiNi_{0.8}Co_{0.1}Mn_{0.1}O_2$ (hereinafter, NCM811) having a uniform composition throughout particles was used as a cathode active material.

Examples 2 to 26 and Comparative Examples 2 to 6

The same procedures as described in Example 1 were conducted to prepare batteries except that cathode active materials, ceramic coating layers, and base films respectively having composition and thickness in a range listed in Table 3 below were used.

TABLE 3

| Section | Cathode active material (composition) | Upper ceramic coating layer (composition/ thickness μm) | Base film (composition/ thickness μm) | Lower ceramic coating layer (composition/ thickness μm) |
|---|---|---|---|---|
| Example 1 | CAM 1 | A-1/1 | PE/16 | A-1/1 |
| Example 2 | CAM 1 | A-1/2 | PE/16 | A-1/2 |
| Example 3 | CAM 1 | A-1/3 | PE/16 | A-1/3 |
| Example 4 | CAM 1 | A-1/5 | PE/16 | A-1/5 |
| Example 5 | CAM 1 | A-1/7 | PE/16 | A-1/7 |
| Example 6 | CAM 1 | A-1/10 | PE/16 | A-1/10 |
| Example 7 | CAM 1 | A-1/2 | PE/16 | — |
| Example 8 | CAM 1 | A-1/4 | PE/16 | — |
| Example 9 | CAM 1 | A-1/6 | PE/16 | — |
| Example 10 | CAM 1 | A-1/10 | PE/16 | — |
| Example 11 | CAM 1 | A-1/14 | PE/16 | — |
| Example 12 | CAM 1 | A-1/20 | PE/16 | — |
| Example 13 | CAM 2 | A-1/1 | PE/16 | A-1/1 |
| Example 14 | CAM 2 | A-1/2 | PE/16 | A-1/2 |
| Example 15 | CAM 2 | A-1/3 | PE/16 | A-1/3 |
| Example 16 | CAM 2 | A-1/5 | PE/16 | A-1/5 |
| Example 17 | CAM 2 | A-1/7 | PE/16 | A-1/7 |
| Example 18 | CAM 2 | A-1/10 | PE/16 | A-1/10 |
| Example 19 | CAM 2 | A-1/2 | PE/16 | — |
| Example 20 | CAM 2 | A-1/4 | PE/16 | — |
| Example 21 | CAM 2 | A-1/6 | PE/16 | — |
| Example 22 | CAM 2 | A-1/10 | PE/16 | — |
| Example 23 | CAM 2 | A-1/14 | PE/16 | — |
| Example 24 | CAM 2 | A-1/20 | PE/16 | — |
| Example 25 | CAM 1 | A-2/2 | PE/16 | A-2/2 |
| Example 26 | CAM 1 | A-3/2 | PE/16 | — |
| Comparative Example 1 | NCM 811 | A-1/1 | PE/16 | A-1/1 |
| Comparative Example 2 | NCM 811 | A-1/2 | PE/16 | A-1/2 |
| Comparative Example 3 | NCM 811 | A-1/3 | PE/16 | A-1/3 |
| Comparative Example 4 | NCM 811 | A-1/5 | PE/16 | A-1/5 |
| Comparative Example 5 | NCM 811 | A-1/7 | PE/16 | A-1/7 |
| Comparative Example 6 | NCM 811 | A-1/10 | PE/16 | A-1/10 |

A-1: ceramic coating layer using boehmite of Example 1
A-2: ceramic coating layer using Al(OH)$_3$ as the ceramic powders in Example 1
A-3: ceramic coating layer using 95 wt. % of boehmite as the ceramic powders in Example 1

Test Procedure

1. Life-Span Property at Room Temperature

After repeating the charging (CC-CV 2.0 C 4.2 V 0.05 C CUT-OFF) and discharging (CC 2.0 C 2.75 V CUT-OFF) with the cells prepared in the examples and comparative examples 500 times, the discharge capacity at 500 times was calculated in % to a discharge capacity at 1 time, thus determining life-span property at room temperature.

Results thereof are shown in Table 4 below.

2. Evaluation of Penetration Safety

The batteries prepared in the examples and comparative examples were penetrated with a nail from an outside, to confirm whether the batteries were ignited or exploded.

Results thereof are shown in Table 4 below.

TABLE 4

| Section | Life-span (%) (500 cycle) | Penetration safety |
|---|---|---|
| Example 1 | 80 | Ignited |
| Example 2 | 80 | Non-ignited |
| Example 3 | 80 | Non-ignited |
| Example 4 | 79 | Non-ignited |
| Example 5 | 77 | Non-ignited |
| Example 6 | 70 | Non-ignited |
| Example 7 | 80 | Ignited |
| Example 8 | 80 | Non-ignited |
| Example 9 | 80 | Non-ignited |
| Example 10 | 79 | Non-ignited |
| Example 11 | 78 | Non-ignited |
| Example 12 | 71 | Non-ignited |
| Example 13 | 81 | Ignited |
| Example 14 | 81 | Non-ignited |
| Example 15 | 81 | Non-ignited |
| Example 16 | 80 | Non-ignited |
| Example 17 | 88 | Non-ignited |
| Example 18 | 72 | Non-ignited |
| Example 19 | 81 | Non-ignited |
| Example 20 | 81 | Non-ignited |
| Example 21 | 81 | Non-ignited |
| Example 22 | 80 | Non-ignited |
| Example 23 | 78 | Non-ignited |
| Example 24 | 73 | Non-ignited |
| Example 25 | 81 | Non-ignited |
| Example 26 | 80 | Non-ignited |
| Comparative Example 1 | 70 | Ignited |
| Comparative Example 2 | 68 | Ignited |
| Comparative Example 3 | 65 | Ignited |
| Comparative Example 4 | 60 | Non-ignited |
| Comparative Example 5 | 55 | Non-ignited |
| Comparative Example 6 | 50 | Non-ignited |

Referring to the above Table 4, it can be seen that the batteries of the examples exhibit superior life-span property and penetration safety, compared to those of the comparative examples.

Specifically, comparing the batteries of Examples 1 to 6 having the same thickness as each other with those of Comparative Examples 1 to 6, it can be seen that, when using the cathode active material according to the present invention, the batteries were not ignited during the evaluation of penetration from the case that the ceramic coating layer has a total thickness of 4 μm, but when using the cathode active material different from the present invention, the batteries were ignited during the evaluation of penetration, except for the case that the ceramic coating layer has a total thickness of 10 μm or more.

Further, it can be seen that, in Example 26 using the same ceramic powders as Example 1 in a ratio of the ceramic power to the binder of 95 wt. %:5 wt. %, the battery was ignited even when the ceramic coating layer has a total thickness of 2 μm.

In addition, it can be seen that, when using the cathode active material having a uniform composition, as the thickness of the ceramic coating layer was increased, the life-span property was significantly reduced, but when using the cathode active material according to the present invention, even if the thickness of the ceramic coating layer was increased, excellent life-span property was exhibited without significantly affecting the same.

What is claimed is:
1. A lithium secondary battery, comprising:
a cathode electrode comprising a cathode active material containing lithium-metal oxide;
an anode electrode; and a separation film installed between the cathode electrode and the anode electrode, the separation film comprising a base film and a ceramic coating layer formed on at least one surface of the base film,
wherein the lithium-metal oxide is represented by Formula 1 below, $$Li_xM1_aM2_bM3_cO_y \quad \text{[Formula 1]}$$

wherein M1, M2 and M3 are selected from the group consisting of Ni, Co, Mn, Na, Mg, Ca, Ti, V, Cr, Cu, Zn, Ge, Sr, Ag, Ba, Zr, Nb, Mo, Al, Ga and B, and
$0<x\leq1.1$, $2\leq y\leq2.02$, $0<a<1$, $0<b<1$, $0<c<1$, and $0<a+b+c\leq1$; and
the cathode active material having regions comprised of:
a core part within 0.1 μm radius from a center of the cathode active material;
a surface part within 0.1 μm from an outmost portion of the cathode active material; and
an intermediate region between the core part and the surface part, the intermediate region comprising a concentration gradient region wherein M1 and M3 have a concentration gradient in a direction from the core part to the surface part and a non-concentration gradient region wherein M1 and M3 do not have a concentration gradient in a direction from the core part to the surface part; and
wherein M2 has a constant concentration throughout the cathode active material from the core part to the surface part.

2. The lithium secondary battery according to claim 1, wherein the concentration of M3 is increased within the concentration gradient region in the direction from the core part to the surface part, and the concentration of M1 is decreased within the concentration gradient region in the direction from the core part to the surface part.

3. The lithium secondary battery according to claim 2, wherein the concentrations of M3 and M1 are constant within the core part and the surface part and the surface part.

4. The lithium secondary battery according to claim 2, wherein the M1, M2 and M3 are Ni, Co and Mn, respectively.

5. The lithium secondary battery according to claim 2, wherein the M1 is Ni, and $0.6\leq a\leq0.95$ and $0.05\leq b+c\leq0.4$.

6. The lithium secondary battery according to claim 2, wherein the M1 is Ni, and $0.7\leq a\leq0.9$ and $0.1\leq b+c\leq0.3$.

7. The lithium secondary battery according to claim 1, wherein the ceramic coating layer includes ceramic powders having an average particle diameter of 0.01 to 2.0 μm.

8. The lithium secondary battery according to claim 1, wherein the ceramic coating layer includes the ceramic powders in an amount of 80 to 97% by weight to a total weight of the coating layer.

9. The lithium secondary battery according to claim 1, wherein the ceramic coating layer includes metal oxide containing at least one metal selected from the group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cesium (Ce), as the ceramic powders.

10. The lithium secondary battery according to claim 1, wherein the ceramic coating layer includes at least one selected from the group consisting of $Al_2O_3$, $TiO_2$, $ZrO2$, $Y_2O_3$, ZnO, CaO, NiO, MgO, $SiO_2$, SiC, $Al(OH)_3$, AlO(OH), $BaTiO_3$, $PbTiO_3$, PZT, PLZT, PMN-PT, $HfO_2$, $SrTiO_3$, $SnO_3$ and $CeO_2$, as the ceramic powders.

11. The lithium secondary battery according to claim 1, wherein the ceramic coating layer formed on the one surface of the separation film has a thickness of 1 to 10 μm.

12. The lithium secondary battery according to claim 1, wherein the ceramic coating layer has a sum of total thickness of 2 to 20 μm.

13. The lithium secondary battery according to claim 1, wherein the non-concentration gradient region comprises a first non-concentration gradient region between the core part and the concentration gradient region and a second non-concentration gradient region between the concentration gradient region and the surface part.

14. The lithium secondary battery according to claim 1, wherein the intermediate region comprises the non-concentration gradient region between the core part and the concentration gradient region.

15. A lithium secondary battery, comprising:
a cathode electrode comprising a cathode active material, the cathode electrode having a core part and a surface part;
an anode electrode; and
a separation film installed between the cathode electrode and the anode electrode, the separation film comprising a base film and a ceramic coating layer formed on at least one surface of the base film,
wherein the cathode active material consists of one or more lithium-metal oxides containing Ni, Co and Mn, and at least one of said one or more lithium metal oxides includes a compound represented by Formula 1 and includes a concentration gradient region between the core part and the surface part:

$$LixM1aM2bM3cOy \quad \text{[Formula 1]}$$

$0<x<1.1$, $2<y<2.02$, $0<a<1$, $0<b<1$, $0<c<1$, and $0<a+b+c<1$,
wherein M3 is Mn and a concentration of M3 continuously increases in the concentration gradient region in a direction from the core part to the surface part;
M1 is Ni and a concentration of M1 continuously decreases in the concentration gradient region in a direction from the core part to the surface part; and
M2 is Co and a concentration of M2 is constant from the core part to the surface part;
the core part within 0.1 μm radius from a center of the cathode active material; and
the surface part within 0.1 μm from an outmost portion of the cathode active material.

16. The lithium secondary battery according to claim 15, wherein the compound represented by Formula 1 further includes non-concentration gradient regions between the core part and the concentration gradient region, and between the concentration gradient region and the surface part, and M1 and M3 do not have a concentration gradient in the non-concentration gradient regions.

17. The lithium secondary battery according to claim 15, wherein $0.7\leq a\leq0.9$ and $0.1\leq b+c\leq0.3$.

* * * * *